United States Patent [19]

Ohtomo et al.

[11] 4,245,825
[45] Jan. 20, 1981

[54] SHOCK ABSORBER FOR WHEELED VEHICLE

[75] Inventors: Masaru Ohtomo, Minokomo; Sumio Hiroi; Hisao Inoue, both of Kagamihara; Siniti Higuti, Kani, all of Japan

[73] Assignee: Kayaba Kogyo Kabushiki Kaisha, Tokyo, Japan

[21] Appl. No.: 47,149

[22] Filed: Jun. 11, 1979

[51] Int. Cl.³ .............................................. F16F 9/06
[52] U.S. Cl. .................................. 267/64 R; 188/315
[58] Field of Search ..................... 188/315, 322, 269; 267/64 R, 65 R

[56] References Cited

U.S. PATENT DOCUMENTS

| | | | |
|---|---|---|---|
| 3,378,110 | 4/1968 | Parrish | 188/315 |
| 3,513,947 | 5/1970 | Duckett | 188/315 |

FOREIGN PATENT DOCUMENTS

| | | | |
|---|---|---|---|
| 2715826 | 10/1977 | Fed. Rep. of Germany | 188/315 |
| 2813992 | 10/1978 | Fed. Rep. of Germany | 188/315 |
| 586346 | 12/1958 | Italy | 188/315 |

*Primary Examiner*—Edward R. Kazenske
*Attorney, Agent, or Firm*—David G. Alexander

[57] ABSTRACT

An outer cylinder (18) is coaxially disposed around an inner cylinder (12). The lower ends of the cylinders (12), (18) are closed but communicate with each other and are mechanically connected to an axle of a wheeled vehicle. A piston (13) is sealingly slidable in the inner cylinder (12) and is connected via a piston rod (14) to a frame of the vehicle. The rod (14) extends upwardly through a rod guide (17) which closes the upper end of the inner cylinder (12). A seal (24) disposed above the rod guide (17) closes the upper end of the outer cylinder (18). The inner cylinder (12) and lower portion of the outer cylinder (18) are filled with liquid which damps movement of the piston (13) caused by irregularities in the road surface. The upper portion of the outer cylinder (18) is filled with compressed air. An annular check valve (63) is disposed in a passageway (56) leading from a space (26) between the rod guide (17) and seal (24) to the upper portion of the outer cylinder (18). The check valve (63) allows flow of liquid and entrained air from the upper portion of the outer cylinder (12) to the upper portion of the outer cylinder (18) but not in the reverse direction and comprises a base (63a) which is fittingly retained in a groove (17b) formed in an upper end of the rod guide (17). A resilient edge portion (63b) of the check valve (63) extends upwardly into sealing engagement with a spring seat (62) which engages with a lower end of the seal (24). A compression spring (64) disposed between the spring seat (62) and base portion (63a) of the check valve (63) presses the spring seat (62) against the seal (24) and presses the base portion (63a) of the valve (63) against the rod guide (16).

8 Claims, 5 Drawing Figures

SHOCK ABSORBER FOR WHEELED VEHICLE

BACKGROUND OF THE INVENTION

The present invention relates to a shock absorber for a wheeled vehicle such as a motorcycle of automobile. A typical shock absorber to which the present invention constitutes a novel and unique improvement is disclosed in U.S. Pat. No. 4,108,287, issued Aug. 22, 1978 to Tetuo Kato, and entitled "DOUBLE-CYLINDER BUFFER".

A piston is sealingly slidable in an inner cylinder and is connected at its upper end to a frame of the vehicle through a piston rod. The lower end of the inner cylinder is closed and connected to an axle of the vehicle. The piston is provided with valves to allow restricted fluid flow therethrough for damping relative movement between the frame and axle. An outer cylinder is coaxially disposed around the inner cylinder and communicates at its lower end with the inner cylinder. The inner cylinder is filled with liquid such as hydraulic fluid. The lower portion of the outer cylinder is filled with the liquid. The space in the outer cylinder above the liquid is filled with a gas such compressed air.

The outer cylinder acts as an overflow reservoir for the inner cylinder. During downward movement of the piston deeper into the inner cylinder, liquid is displaced from the lower portion of the inner cylinder into the outer cylinder to provide an impact or shock absorbing effect.

During operation of the shock absorber, compressed air is aerated into the portion of the inner cyliner above the piston and degrades the shock absorbing effect. It is also necessary to displace liquid from above the piston into the outer cylinder during upward movement of the piston. To achieve this end, the above mentioned patent discloses a check valve which allows flow of air and liquid from the upper portion of the inner cylinder into the upper portion of the outer cylinder but not in the reverse direction. The check valve serves the dual function of removing air from the inner cylinder and allowing displacement of liquid therefrom during the upward movement of the piston.

However, several problems remain unsolved in the embodiment of the prior art check valve system. The check valve member tends to float during assembly of the shock absorber and is difficult to position in exact coaxial relation with the piston rod. As another drawback, the check valve member tends to fatigue at a junction of a base and resilient sealing edge portion thereof finally resulting in separation of the sealing edge portion from the base and failure of the check valve.

SUMMARY OF THE INVENTION

A shock absorber embodying the present invention includes an inner cylinder having a closed lower end, a piston sealingly slidable in the inner cylinder, a piston rod extending upwardly from the piston, a piston rod guide constituting a closed upper end of the inner cylinder, the piston rod slidably extending through the piston rod guide, an outer cylinder coaxially surrounding the inner cylinder and having a closed lower end, passageway means connecting lower end portions of the inner and outer cylinders, a seal constituting a closed upper end of the outer cylinder and being disposed above the piston rod guide, the piston rod sealingly extending through the seal, and a passageway connecting an upper end portion of the outer cylinder with a space between the piston rod guide and the seal, the inner cylinder being filled with liquid, a lower portion of an annular space between the inner and outer cylinders being filled with the liquid and an upper portion of the annular space being filled with pressurized gas. A generally annular valve member has a base portion and an upwardly extending resilient edge portion, the piston rod guide being formed with an annular groove in an upper end thereof, the base portion of the valve member being fittingly retained in the groove. A spring seat engages with a lower surface of the seal, and a compression spring is compressively disposed between the spring seat and the base portion of the valve member, the resilient edge portion of the valve member resiliently engaging with the spring seat so as to allow flow of the liquid through the passageway only from the space between the piston rod guide and the seal to the upper end portion of the outer cylinder.

In accordance with the present invention, an outer cylinder is coaxially disposed around an inner cylinder. The lower ends of the cylinders are closed but communicate with each other and are mechanically connected to an axle of a wheeled vehicle. A piston is sealingly slidable in the inner cylinder and is connected via a piston rod to a frame of the vehicle. The rod extends upwardly through a rod guide which closes the upper end of the inner cylinder. A seal disposed above the rod guide closes the upper end of the outer cylinder. The inner cylinder and lower portion of the outer cylinder are filled with liquid which damps movement of the piston caused by irregularities in the road surface. The upper postion of the outer cylinder is filled with compressed air. An annular check valve is disposed in a passageway leading from a space between the rod guide and seal to the upper portion of the outer cylinder. The check valve allows flow of liquid and trapped air from the upper portion of the inner cylinder to the upper portion of the outer cylinder but not in the reverse direction and comprises a base which is fittingly retained in a groove formed in an upper end of the rod guide. A resilient edge portion of the check valve extends upwardly into sealing engagement with a spring seat which engages with a lower end of the seal. A compression spring disposed between the spring seat and base of the check valve presses the spring seat against the seal and presses the base of the valve against the rod guide.

It is an object of the present invention to provide a shock absorber for a wheeled vehicle which may be manufactured and assembled precisely and efficiently on a commercial production basis.

It is another object of the present invention to provide a shock absorber comprising a check valve which is more effective and durable than comparable arrangements proposed heretofore.

It is another object of the present invention to provide a generally improved shock absorber for a wheeled vehicle.

Other objects, together with the foregoing, are attained in the embodiments described in the following description and illustrated in the accompanying drawing.

DESCRIPTION OF THE PREFERRED EMBODIMENTS

While the shock absorber of the present invention is susceptible of numerous physical embodiments, depending upon the environment and requirements of use, substantial numbers of the herein shown and described embodiments have been made, tested and used, and all have performed in an eminently satisfactory manner.

Figure 1:
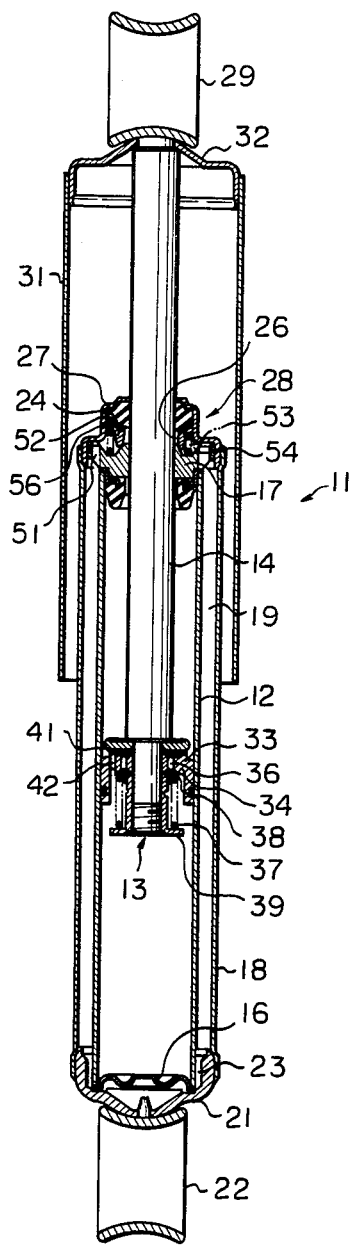
FIG. 1 is a vertical sectional view of a prior art shock absorber.

Referring now to FIG. 1 of the drawing, a prior art shock absorber for a wheeled vehicle is generally designated by the reference numeral 11 and comprises an inner hollow cylinder 12. A piston 13 fixed to the lower end of a piston rod 14 is sealingly slidable in the cylinder 12. The lower end of the cylinder 12 is closed by a cap 16. The upper end of the cylinder 12 is closed by a rod guide 17 through which the piston rod 14 upwardly extends.

An outer cylinder 18 coaxially surrounds the inner cylinder 12 with an annular gap or space 19 provided therebetween. The lower end of the cylinder 18 is sealed by a cap 21 which also rigidly embraces the lower end of the cylinder 12. The cap 21 is connected to an axle of the vehicle (not shown) by an eyelet 22 rigidly fixed to the cap 21. The lower ends of the cylinders 12 and 18 communicate with each other through passageways 23 which provide a desired flow restriction. The upper end of the cylinder 18 is closed by a seal 24 disposed above the rod guide 17 with a space 26 being provided therebetween. The seal 24 is retained inside a cap 27. A check valve 28 is disposed between the seal 24 and guide 17 as will be described in detail below.

An eyelet 29 is fixed to the upper end of the rod 14 for attachment to a frame member (not shown) of the vehicle. A protective cover tube 31 extends downwardly from the eyelet 29 and is fixed thereto by a cap 32.

The entire inner cylinder 12 is filled with a liquid such as hydraulic fluid. The lower portion of the space 19 between the cylinders 12 and 18 is filled with liquid while the portion of the space 19 above the liquid is filled with a pressurized gas such as compressed air.

The piston 13 is provided with a body 33 which sealingly engages the inner wall of the cylinder 12. A check valve in the form of an annular reed or plate 34 opens upon upward movement of the piston 13 to allow fluid flow downwardly through passageways 36. The plate 34 is urged to block the passageways 36 by a compression spring 37 acting through a spring seat 38. The lower end of the spring 37 engages a nut 39 screwed onto the body 33.

Another check valve in the form of an annular leaf spring 41 is arranged to allow fluid flow upwardly through passageways 42 when the piston 13 is moved downwardly. The valves 34 and 41 function to allow restricted fluid flow through the piston 13 and thereby provide a damping effect to movement of the piston 13.

In operation, the cylinders 12 and 18 are forced to move upwardly relative to the piston 13 when the wheel to which the shock absorber 11 is connected encounters a bump in the road surface. The piston 13 moves downwardly relative to the cylinder 12 and compresses the liquid therein. A portion of the liquid moves upwardly through the passageways 42 of piston 13. Another portion of the liquid is displaced into the space 19 through the passageways 23. This combined fluid displacement functions to absorb the shock and prevent the shock from being transferred to the frame of the vehicle.

After riding over the bump, the cylinders 12 and 18 are moved downwardly. Equivalently, it may be considered that the piston 13 moves upwardly relative to the cylinders 12 and 18. A portion of the liquid above the piston 13 flows downwardly through the passageways 36 and another portion of the liquid above the piston 13 flows through the check valve 28 into the space 19. The decreasing pressure below the piston 13 causes liquid to flow from the space 19 into the portion of the cylinder 12 below the piston 13 through the passageways 23.

Air trapped in the portion of the cylinder 12 above the piston 13 by aeration is displaced through the check valve 28 into the space 19 during upward movement of the piston 13 relative to the cylinders 12 and 18. The check valve 28 prevents reverse flow from the upper portion of the space 19 into the upper portion of the cylinder 12. This is because the valve 28 is opened only when the pressure in the upper portion of the cylinder 12 is higher than the pressure in the upper portion of the space 19.

Figure 2:
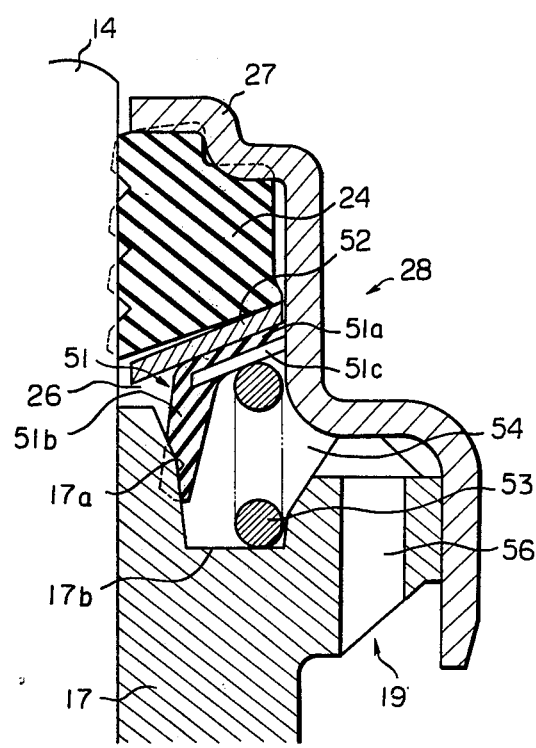
FIG. 2 is an enlarged fragmentary sectional view of a check valve of the prior art shock absorber.

The prior art check valve 28 is illustrated in greater detail in FIG. 2 and comprises a resilient valve member 51 which has a generally annular shape. A spring seat 52 made of a rigid material is disposed between a base 51a of the valve member 51 and the lower end of the seal 24. A resilient edge portion 51b of the valve member 51 extends downwardly and resiliently engages with a valve seat portion 17a of the rod guide 17 in its free state. A rigid washer 51c is fused to the base 51a of the valve member 51. A compression spring 53 is provided in a compressed state between the rigid washer 51c and the bottom of an annular groove 17b formed in the upper end of the rod guide 17. The spring 53 presses the base 51a against the seal 24.

The spring 53 is provided in a spring chamber 54 which is capable of communication with the space 26 through the valve 28 when the valve 28 is open. The chamber 54 communicates with the upper end portion of the space 19 through passageways 56.

In operation, liquid is scraped off the rod 14 by the seal 24 and accumulates in the space 26. In addition, liquid is forced into the space 26 between the rod 14 and guide 16 due to pressure in the upper portion of the cylinder 12 during upward movement of the piston 13 relative to the cylinders 12 and 18. When the pressure in the space 26 exceeds the combined force of the preload of the edge portion 51b of the valve member 51 and the pressure in the chamber 54, the edge portion 51b is forced off the valve seat portion 17a of the rod guide 17 so that liquid and entrained air can flow through the chamber 54 and passageways 56 into the space 19.

The valve 28 is difficult to assemble accurately since the valve element 51 is arranged in a floating manner and thus is difficult to position in coaxial relation with the rod 14. Another drawback is that the edge portion 51b of the valve member 51 flexes at the junction of the edge portion 51b and the base 51a causing fatigue which eventually results in separation of the edge portion 51b form the base 51a and failure of the valve 28.

Figure 3:
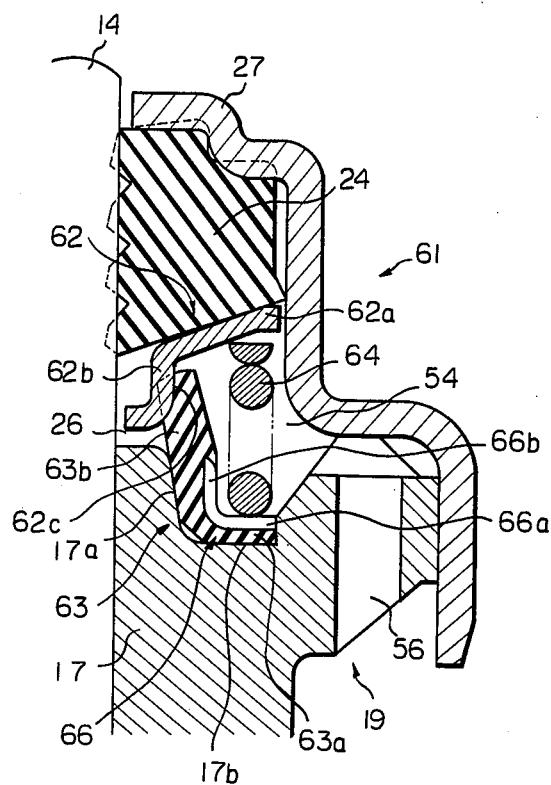
FIG. 3 is similar to FIG. 2 but shows an improved check valve embodying the present invention in a closed condition.
Figure 4:
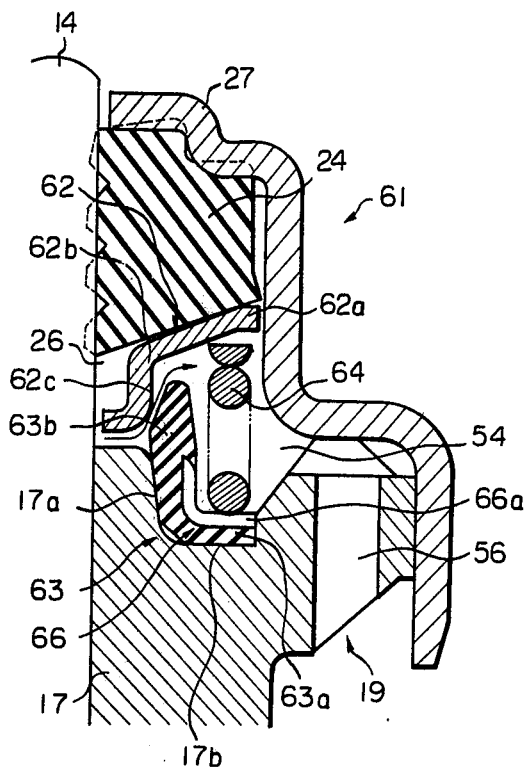
FIG. 4 is similar to FIG. 3 but shows the present check valve in an open condition.

FIGS. 3 and 4 illustrate an improved check valve embodying the present invention which is designated as 61 and replaces the check valve 28. Like elements are designated by the same reference numerals. FIG. 3 shows the valve 61 in a closed condition and FIG. 4 shows the valve 61 in an open condition.

The valve 61 comprises a generally annular spring seat 62 having a generally radially outwardly extending portion 62a which engages with the lower end of the seal 24. The spring seat 62 also has a downwardly axially extending portion 62b, a radially outer edge portion or surface of which constitutes a valve seat portion 62c.

A generally annular valve member 63 has a base portion 63a which engages with the bottom of the groove 17b and a resilient sealing edge portion 63b which engages with a radially inner (left) wall of the groove 17b. The radially inner (left) upper portion of the edge portion 63b engages with the valve seat portion 62c of the spring seat 62 in the free state of the valve member 63. A compression spring 64 urges the spring seat 62a against the seal 24 and urges the base portion 63a of the valve member 63 against the bottom of the groove 17b. Integrally formed with the valve member 63 is a rigid member 66 having a radially outwardly extending portion 66a disposed between the compression spring 64 and the bottom of the groove 17b and an upwardly axially extending portion 66b which presses the edge portion 63b of the valve member 63 against the radially inner wall 17a of the groove 17b.

When the pressure in the space 26 is higher than the pressure in the chamber 54, the edge portion 63b of the valve member 63 is moved away from the valve seat portion 62c of the spring seat 62 as shown in FIG. 4.

The valve member 63 is fittingly retained in the groove 17b and thereby accurately positioned during assembly. In addition, since the junction of the edge portion 63b and the base 63a of the valve member 63 is not stressed during operation, there will not be any fatigue and failure of the valve 61 as occurs in the prior art. The valve 61 is assembled merely by fitting the valve member 63 into the groove 17b, inserting the seal 24, spring seat 62 and spring 64 into the cap 27 and then inserting the rod guide 16 and valve member 63 together with the cylinder 12 into the cylinder 18.

The rigid member 66 bifunctions to give increased mechanical strength to the valve member 63 and also to press the edge portion 63b against the inner wall 17a of the groove 17b. Thus, only the upper portion of the edge portion 63b is flexed during operation with resulting low stress concentration.

Figure 5:
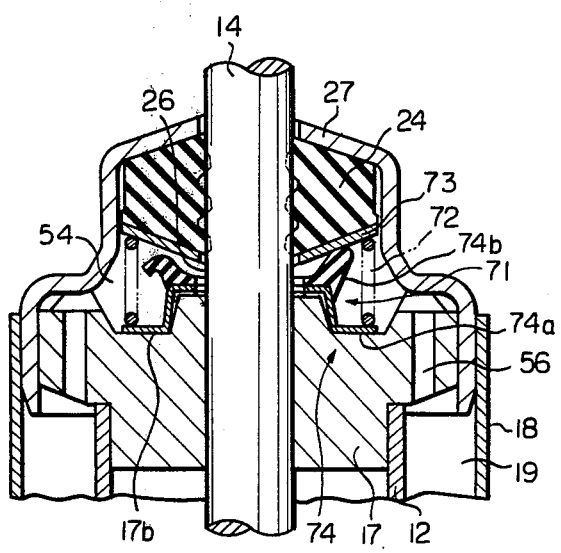
FIG. 5 is an enlarged sectional view of another check valve embodying the present invention illustrating a closed condition and an open condition.

FIG. 5 illustrates another embodiment of the present invention comprising a check valve 71. A compression spring 72 is disposed between a spring seat 73 and a rigid base portion 74a of a generally annular valve member 74 which fits in the groove 17b. A resilient edge portion 74b of the valve member 74 sealingly engages with the spring seat 73 in its free state. The edge portion 74b is moved away from the spring seat 73 as illustrated when the pressure in the space 26 is sufficiently high.

It will be noted that the edge portion 63b of of the valve member 63 extends radially inwardly from the base portion 63a whereas the edge portion 74b of the valve member 74 extends radially outwardly from the base portion 74a. In both of the valves 61 and 71, the sealing edge portions are disposed close to the piston rod 14 and thereby receive pressure on limited areas thereof, increasing the durability of the valves.

In summary, it will be seen that the present invention provides a shock absorber for a wheeled vehicle comprising an improved check valve which may be assembled with increased precision and is more durable compared to the prior art. Various modification will become possible for those skilled in the art after receiving the teachings of the present disclosure without departing from the scope thereof.

What is claimed is:

1. A shock absorber including an inner cylinder having a closed lower end, a piston seaingly slidable in the inner cylinder, a piston rod extending upwardly from the piston, a piston rod guide constituting a closed upper end of the inner cylinder, the piston rod slidably extending through the piston rod guide, an outer cylinder coaxially surrounding the inner cylinder and having a closed lower end, passageway means connecting lower end portions of the inner and outer cylinders, a seal constituting a closed upper end of the outer cylinder and being disposed above the piston rod guide, the piston rod sealingly extending through the seal, and a passageway connecting an upper end portion of the outer cylinder with a space between the piston rod guide and the seal, the inner cylinder being filled with liquid, a lower portion of an annular space between the inner and outer cylinders being filled with the liquid and an upper portion of the annular space being filled with pressurized gas, characterized by comprising:

a generally annular valve member having a base portion and an upwardly extending resilient edge portion, the piston rod guide being formed with an annular groove in an upper end thereof, the base portion of the valve member being fittingly retained in the groove;

a spring seat engaging with a lower surface of the seal; and a compression spring compressively disposed between the spring seat and the base portion of the valve member, the resilient edge portion of the valve member resiliently engaging with the spring seat so as to allow flow of the liquid through the passageway only from the space between the piston rod guide and the seal to the upper end portion of the outer cylinder;

a radially inner portion of the resilient edge portion of the valve member resiliently engaging with the spring seat;

the spring seat being formed with a valve seat portion which extends downwardly and radially inwardly of and engages with the radially inner portion of the resilient edge portion of the valve member.

2. A shock absorber as in claim 1, further comprising valve means provided to the piston to allow restricted fluid flow through the piston.

3. A shock absorber as in claim 1, in which the base portion of the valve member has a radially outwardly extending portion which engages with a bottom of the groove and an axially upwardly extending portion which engages with a radially inner wall of the groove.

4. A shock absorber as in claim 3, further comprising a rigid member disposed between the spring and the radially outwardly extending portion of the base portion of the valve member.

5. A shock absorber as in claim 4, in which the rigid member has an axially upwardly extending portion which urges the axially upwardly extending portion of the valve member against the radially inner wall of the groove.

6. A shock absorber as in claim 5, in which the valve member and rigid member are integral.

7. A shock absorber as in claim 1, in which the base portion of the valve member is rigid.

8. A shock absorber as in claim 1, in which the resilient edge portion of the valve member extends radially inwardly from the base portion thereof.

* * * * *